June 17, 1969     G. D. JAMES     3,450,602
WATER DESALINIZATION SYSTEM
Filed May 20, 1966
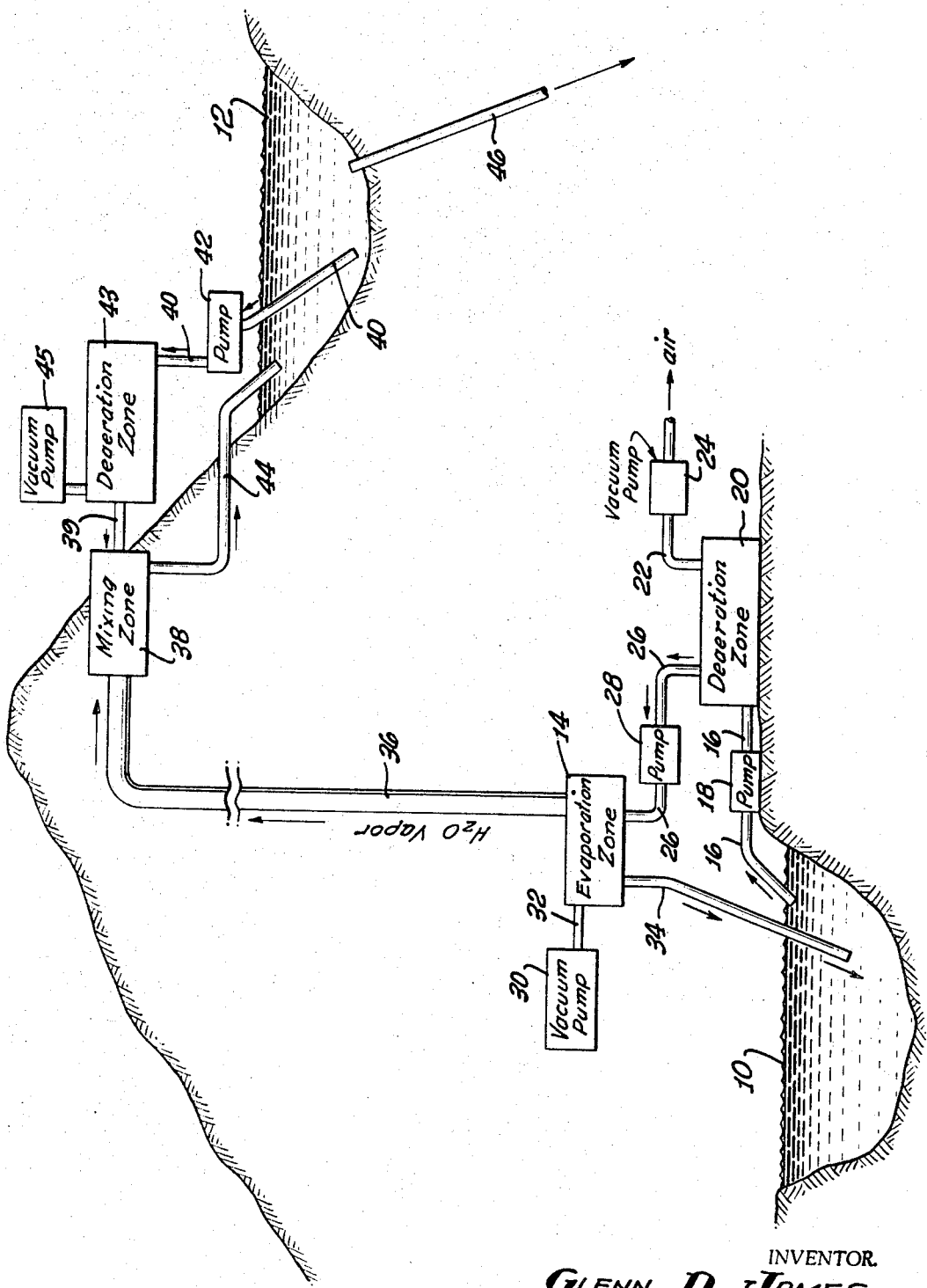
INVENTOR.
GLENN D. JAMES
BY
White & Haefliger
ATTORNEYS.

United States Patent Office 3,450,602
Patented June 17, 1969

3,450,602
WATER DESALINIZATION SYSTEM
Glenn D. James, 1200 Encino Ave.,
Arcadia, Calif. 91006
Filed May 20, 1966, Ser. No. 551,595
Int. Cl. C02b 1/06; B01d 3/10, 1/00
U.S. Cl. 203—11    5 Claims

ABSTRACT OF THE DISCLOSURE

Reduced salinity water is obtained from a saline source by vaporizing the saline liquid under highly reduced pressures at a lower elevation and conveying it free of air to a higher, cooler elevation for condensation and combination with fresh water.

---

This invention relates to water desalinization and generally provides method and apparatus for reducing the salinity of water obtained from naturally occurring saline bodies.

The search for water intensifies. Great metropolitan regions reach far back into mountains for their supply of this the most basic of the commodities of civilization. Ironically, these metropolitan areas are generally located adjacent water bodies, oceans and lakes or rivers which open to the ocean, which for the most part are untapped, for the simple reason of their salinity. Man cannot drink salt water without suffering progressive dehydration. Desalinization is known, but even given the tremendous costs of dams and aqueducts in presently and for centuries conventional water supply systems, present desalinization systems are not competitive in cost with fresh water even brought great distances.

It has occurred to me that advantage may be taken of temperature disparities between adjacent bodies of water at different elevations to bring great volume desalinization costs to reasonable levels. Bodies of saline water at relatively low elevation are warm relative to higher bodies of water. Generation of water vapor proximate such a body of water, utilizing its relative warmth, can separate the water from its salt. Condensation of the vapor can be accomplished at quite small costs by transferring the heat of condensation to a relatively cool body of water generally found at relatively high elevations, e.g. mountain lakes, either natural or artificial.

Particularizing, the invention provides a method of producing reduced salinity water including the steps of conveying water vapor from a lower elevation to a higher elevation, generating water vapor proximate the lower elevation to be so conveyed, the generation including transferring saline water from an openly exposed, relatively warm body thereof, and converting the water vapor so conveyed to water at the higher elevation, the conversion step including transferring heat produced in the vapor condensation to an openly exposed, relatively cool water body.

Apparatus for carrying out the method is also provided including a pair of chambers, a first closed opaque chamber at the relatively low elevation proximate an openly exposed natural body of relatively warm saline water and a second chamber at a relatively high elevation proximate an openly exposed body of relatively cool water, means associated with the first chamber for converting saline water to vapor, means associated with the second chamber for converting water vapor to water and means for transferring heat produced in vapor condensation to the body of relatively cool water, and conduit means extending in water vapor transfer communication between the chambers.

The invention is illustrated by the drawing in which the single figure is a schematic view of the apparatus of one embodiment of the present invention.

As will be apparent from the foregoing the method described herein offers opportunities for low cost production of reduced salinity water:

(1) In the taking advantage of the natural heat content or initial latent heat of vaporization of normally low elevation saline water bodies to facilitate water vapor generation;

(2) In taking advantage of the natural cooling capacity of normally high elevation water bodies to facilitate condensing water vapor to water; and, (3) In taking advantage of the natural tendency of water vapor to rise, to lift water great distances, if necessary. Because vapor is generated proximate the saline water body, pumping requirements are minimal. Because vapor condensation is proximate the receiving body of water, again, pumping needs are minimal.

Referring to the drawing, a relatively low elevation body of openly exposed, relatively warm body of saline water such as a salt lake, a sea, ocean, sound, or tidewater river is depicted at 10. A relatively high elevation body of openly exposed, relatively cool body of generally fresh or potable water such as a natural or artificial lake or stream is depicted at 12.

Vapor generation is provided proximate water body 10 at chamber 14. Saline water is drawn from water body 10 through pipe 16 and pumped by displacement pump 18 into deaeration chamber 20. As shown, it is preferred to draw water from the upper levels of water body 10 where heat content is likely to be greatest. If desired, water drawing can be done only at certain periods of the day such as forenoon to midafternoon to get maximum heat content saline water. The deaeration step and deaeration chamber 20 is not necessary, if air and other gases in the saline water are not of such volume as to interfere with subsequent steps. Volatiles, if any, are drawn off through pipe 22 by vacuum pump 24 and can be vented to the atmosphere. The pressure level within the deaeration chamber 20 is less than atmospheric but above the vapor pressure at the given saline water temperature so that deaeration, and not vaporization, preferentially occurs.

The devolatilized deaerated saline water is then transferred through pipe 26 by displacement pump 28 to evaporation chamber 14. Pressure level within evaporation chamber 14 is at or below the vapor pressure of the saline water at its temperature. Thus the saline water "boils" and gives up water vapor. Suitable pressure level is maintained by vacuum pump 30 communication with chamber 14 through pipe 32. Once the system is evacuated pump 30 can be shut off if deaeration is not required. For substantially warm saline water, e.g. at 75° F. and above, no auxiliary heating is required in the evaporation chamber 14. Other and lower temperature saline water may be heated if desired as an alternative to more effective pressure reduction in the evaporation chamber 14. Salt enriched water or brine, remaining from the vaporization step, is returned to the saline water body 10 through return pipe 34.

Conduit 36, a water vapor tight pipe, leads water vapor generated in evaporation chamber 14 upwardly to the relatively high, relatively cool water body 12. Water vapor, salt free, is condensed in mixing chamber 38, proximate the cool water body 12. To provide removal of heat of condensation, water is drawn from cool water body 12 along pipe 40 by displacement pump 42 and following deaeration in chamber 43 under the reduced pressure generated by vacuum pump 45 the cool water is passed into chamber 38 along line 39 where heat transfer contact with water vapor from conduit 36 is accomplished as by countercurrent flow techniques. Water level within chamber 38 is below the inlet from conduit 36. The condensed vapor water and the heat transfer water can be fed to cool water body 12 along pipe 44 to replenish that body which can be in use as a reservoir drawable through outlet pipe 46. If the cool water body 12 is not suitable for receiving fresh water, it is used to cool water vapor but is not mixed therewith and the condensed vapor and coolant water are taken off in separate streams.

In summary, the present invention utilizes a source of relatively warm water providing enough heat to generate vapor at a reduced pressure and a source of relatively cool water for heat exchange to obtain potable water.

Water bodies both saline and fresh are daily warmed by the sun and nightly cooled. Since cooler water is more dense, convection and agitation considerations aside, the night cooled surface water sinks into the water body. This process continues with the water most cooled, that is the water exposed to the lowest temperature, forming the lowest layer in the water body. The warmest water of the water body forms the highest layer. If the contents of a water body are cycled once every 30 days the bottom layer is at the temperature of the coldest night for the past 30 days, the next to bottom layer at the temperature of the next coldest night and so on. Thus, a gradient of temperatures is set up across the depth of a water body. When different water bodies are separated in altitude, the normal gradient is increased because the nights are cooler at the elevated location and the days are warmer at the lower location.

Example

A relatively low elevation saline water body is selected, such as a salt sea or lake. Pipes are installed leading from the surface layer of water to take advantage of the sun warmed portion of the lake. In the afternoon, a hot salt water supply is drawn through the pipes into a reservoir, enough for a 24-hour feed to the remainder of the system. A reservoir is not required if only afternoon operation is desired. Either directly from the lake or from the reservoir, hot water is passed into a deaeration chamber for removal of volatiles. The devolatilization chamber comprises one or more chambers affording progressively higher vacuum up to just more than the water vapor pressure. To facilitate giving up of volatiles, the water is passed over surface exposing barriers in the chamber, e.g., to a water depth of about 2 inches.

Following devolatilization, the hot saline water is lifted to the evaporation chamber in which a pressure below the vapor pressure of the hot saline water is being maintained, e.g., about 28 inches Hg. Barriers again are used in this chamber to maximize surface exposure. The lifting of water to the evaporation chamber can be accomplished by displacement pumps or by having the water body in open communication with the evaporation chamber. With greatly reduced pressures in this chamber the water will rise 30 feet or so, enough to carry the water to the evaporation chamber.

The vapors generated in the evaporation chamber rise naturally through the vacuum conduit to the upper, colder water body. In a typical system about 1° C. will be lost by heat transfer for each 430 meters of rise and about 1.8° C. per mile of rise by condensation. Condensed vapor produced in the conduit is caught by appropriate catch basins so this fresh water is not lost. Because of the prior removal of air, the movement upward in the conduit is at high wind velocities and not at molecular diffusion rates. Typically, the velocity will be in the range of 200 miles per hour and with appropriate conduit design, the friction within the conduit is practically negligible.

At the top of the conduit, a condensing chamber receives the vapor. Fresh cold water drawn from the coldest, bottom portion of the upper water body is used to lower the temperature of the vapor to condensing levels. Good heat transfer is important in this step. Hence countercurrent flow of cold water and vapor such as is achieved by passing the cold water over barriers thinning the water depth, to say ½₂ inch, through the vapor filled chamber or raining the cold water through a vapor stream is preferred. An advantage of the system described is that heat transfer is liquid surface-to-gas-surface without intermediate metal conductors.

Often wave motion can be used to provide energy to circulate water through the evaporation chamber. Static heads derived from capturing tidal water behind reef-like dams or from dam adjacent basins can be used to lift the water the required amount.

All vacuum pump housings and outer surfaces of the system must be vapor tight of course.

The lowness of temperatures required at the upper water body will vary with the temperature available in the lower body. For example 20° C. (67° F.) saline water can be effectively processed with 7° C. (44° F.) fresh water in the upper body, a combination affording a differential of about 13° C.

The elevation differential between warm and cool water bodies is not narrowly critical. In general, the difference should be above about 2,000 feet such as obtains where the lower saline water body is at sea level or below and the upper fresh cool water body is a mountain lake 2,000 or more feet above sea level.

An important advantage of the water desalinization system described herein is that water is produced, by condensation, in areas possibly quite distant from the saline water body. This feature of conveying water vapor only makes possible the storing of water, with no pumping cost, at elevated locations, above the area of required use and enables the irrigation of areas remote to water, such as deserts where mountains are close at hand.

I claim:

1. Method of producing reduced salinity water, including conveying water vapor freed of air and isolated from the atmosphere from a lower elevation to a higher elevation, generating said water vapor proximate said lower elevation to be so conveyed, said generation including transferring saline water from an openly exposed, relatively warm body thereof to an enclosed space at said lower elevation, said transferred water having a predetermined heat content sufficient to cause water vaporization at some reduced level of pressure through the initial latent heat of vaporization and converting said water into vapor solely through reduction of pressure thereon in said space to said reduced level of pressure and reconverting said water vapor so conveyed to water at the higher elevation, said reconversion including transferring all heat absorbed by the vapor in its generation to an enclosed direct contact condensing zone associated with an opened exposed, relatively cool water body.

2. Method as claimed in claim 1 in which the water from the condensed vapor is added to the relatively cool water body.

3. Method as claimed in claim 1 in which the pressure in the system is lowered first to a level sufficient to evolve air therein which air then is separated and vented and thereafter to a level less than the vapor pressure of the water.

4. Apparatus for reducing the salinity of water including a pair of chambers, a first closed, opaque chamber at a relatively low elevation proximate an openly exposed natural body of relatively warm saline water having a predetermined heat content and a second closed chamber at a relatively high elevation proximate an openly exposed body of relatively cool water, means associated with the first chamber for deaerating the water entering the chamber, means operative to convert saline water in the chamber to vapor solely through the initial latent heat of vaporization content and through pressure reduction to levels sufficient to vaporize said water at its heat content from said warm water body, means associated with the second chamber for converting water vapor to water and means for transferring all heat absorbed by the vapor in its generation to the body of relatively cool water by direct contact condensation of the vapor, and conduit means extending in water vapor transfer communication between the first and the second chambers.

5. Apparatus as claimed in claim 4 including means for transferring water from the relatively warmer portion of the saline water body to the first chamber, and means for mixing with the water vapor, water from the relatively cooler portions of the relatively cool water body.

References Cited

UNITED STATES PATENTS

| | | | |
|---|---|---|---|
| 2,636,129 | 4/1953 | Agnew | 290—2 |
| 3,096,257 | 7/1963 | Foutz | 202—205 |
| 3,140,986 | 7/1964 | Hubbard | 203—100 X |
| 3,206,379 | 9/1965 | Hill | 203—10 |
| 3,338,797 | 8/1967 | Hermansen et al. | 202—234 |

FOREIGN PATENTS

| | | |
|---|---|---|
| 424,663 | 8/1947 | Italy. |
| 442,502 | 11/1948 | Italy. |

NORMAN YUDKOFF, *Primary Examiner.*

J. SOFER, *Assistant Examiner.*

U.S. Cl. X.R.

202—205; 203—88